(12) United States Patent
Gronát et al.

(10) Patent No.: US 11,586,881 B2
(45) Date of Patent: Feb. 21, 2023

(54) MACHINE LEARNING-BASED GENERATION OF SIMILAR DOMAIN NAMES

(71) Applicant: Avast Software s.r.o., Prague (CZ)

(72) Inventors: Petr Gronát, Prague (CZ); Petr Kaderábek, Prague (CZ); Jakub Sanojca, Prague (CZ)

(73) Assignee: Avast Software s.r.o., Prague (CZ)

( * ) Notice: Subject to any disclaimer, the term of this patent is extended or adjusted under 35 U.S.C. 154(b) by 341 days.

(21) Appl. No.: 16/799,738

(22) Filed: Feb. 24, 2020

(65) Prior Publication Data
US 2021/0264233 A1 Aug. 26, 2021

(51) Int. Cl.
*H04L 9/40* (2022.01)
*G06N 3/049* (2023.01)
*G06N 3/08* (2023.01)
*G06K 9/62* (2022.01)

(52) U.S. Cl.
CPC ............ *G06N 3/049* (2013.01); *G06K 9/623* (2013.01); *G06K 9/6215* (2013.01); *G06N 3/08* (2013.01); *H04L 63/1483* (2013.01)

(58) Field of Classification Search
CPC ........ G06N 3/049; G06N 3/08; G06N 3/0445; G06N 3/0454; G06K 9/6215; G06K 9/623; G06K 9/6271; H04L 63/1483; H04L 61/302; H04L 61/3025; G06V 10/82
See application file for complete search history.

(56) References Cited

U.S. PATENT DOCUMENTS

| | | | | |
|---|---|---|---|---|
| 9,787,634 | B1* | 10/2017 | Lai | H04L 61/3025 |
| 9,990,432 | B1* | 6/2018 | Lai | G06F 16/951 |
| 10,467,536 | B1* | 11/2019 | Lai | H04L 67/10 |
| 10,778,640 | B1* | 9/2020 | Cholleton | G06F 16/951 |
| 11,080,483 | B1* | 8/2021 | Islam | G06F 40/205 |
| 2006/0112066 | A1* | 5/2006 | Hamzy | H04L 61/30 |
| 2006/0112094 | A1* | 5/2006 | Sullivan | G06F 16/9566 |
| | | | | 707/999.005 |
| 2008/0250159 | A1* | 10/2008 | Wang | H04L 61/30 |
| | | | | 709/239 |

(Continued)

OTHER PUBLICATIONS

Anderson et al., "DeepDGA: Adversarially-Tuned Domain Generation and Detection", Oct. 6, 2016 (Year: 2016).*

(Continued)

*Primary Examiner* — Aaron W Carter
(74) *Attorney, Agent, or Firm* — Avek IP LLC; William B. Kircher

(57) ABSTRACT

A method of generating receiving a valid domain name comprises evaluating a received valid domain name in a neural network trained to generate similar domain names, and providing an output comprising at least one domain name similar to the received valid domain name generated by the neural network. In a further example, a recurrent neural network is trained using valid domain names and observed malicious similar domain names and/or linguistic rules. In another example, the output of the recurrent neural network further comprises a similarity score reflecting a degree of similarity between the valid domain name and the similar domain name, such that the similarity score can be used to generate a ranked list of domain names similar to the valid domain name.

18 Claims, 5 Drawing Sheets

(56) References Cited

U.S. PATENT DOCUMENTS

| | | | |
|---|---|---|---|
| 2011/0276716 A1* | 11/2011 | Coulson | H04L 67/563 |
| | | | 709/238 |
| 2012/0084281 A1 | 4/2012 | Colosi | |
| 2017/0012924 A1* | 1/2017 | Freeman | H04L 51/23 |
| 2020/0259851 A1* | 8/2020 | Manoselvam | H04L 63/1425 |
| 2020/0349430 A1* | 11/2020 | Schmidtler | G06N 3/0445 |
| 2021/0264233 A1* | 8/2021 | Gronát | G06V 10/82 |
| 2021/0377303 A1* | 12/2021 | Bui | G06N 20/20 |

OTHER PUBLICATIONS

DeepDGA: Adversarially-Tuned Domain Generation and Detection;https://arxiv.org/abs/1610.01969; Anderson, Hyrum S. et al.; Oct. 6, 2016 Abstract Only.

* cited by examiner

INPUT VALID DOMAIN: YOUTUBE.COM

OUTPUT SIMILAR DOMAINS:
YOUTUBOEM.COM
YOUTBUE.COM
YOUTUB.COM
YOUTATUE.MS
YOUTBUE.CL
YOUDUTUE.MEBLY.COM
YOUTUBOE.CZ
YOUTUTAE.COM
YOUTABUE.COM
YOUTABVE.COM
YOUTBAOCE.CZ
YOUTUPAS.COM
YOUTTUE.CM
YOUTBU.CEM
YOUTAUTS.COM
YOUTURUEX.COM
YOUBUTE.COM
YOUTAUBE.COM
YOUTBU.COM

FIG. 5

MACHINE LEARNING-BASED GENERATION OF SIMILAR DOMAIN NAMES

FIELD

The invention relates generally to generation of similar domain names, and more specifically to using machine learning such as a neural network to generate similar domain names.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Because using a web browser to browse the Internet has become the primary way in which many people interact with others via a network, web browser tools such as malware plugins, ad and popup blockers, anti-tracking plugins, and other such tools have become common features or extensions for web browsers.

For example, a common ploy to steal account credentials includes emailing a user a message pretending to be the account provider, alerting them that their account has been compromised and requires attention. A link is provided to a URL that appears to be the account provider, but is instead a link to another server run by the malicious user attempting to steal credentials. The server can then perform malicious actions such as downloading malicious software to the user's computer, or can hosts a fake website that prompts the user to enter their credentials which the malicious user captures and can use to compromise the user's account.

While anti-malware tools can block some known malicious sites or block executables with known malicious code, it is more difficult to prevent a user from entering credentials at a previously unknown fake website. It is therefore desirable to better manage user access to fake websites emulating real websites to protect user credentials and other such data.

SUMMARY

One example embodiment of the invention comprises a method of generating receiving a valid domain name comprises evaluating a received valid domain name in a recurrent neural network trained to generate similar domain names, and providing an output comprising at least one domain name similar to the received valid domain name generated by the recurrent neural network.

In another example, the output of the recurrent neural network further comprises a similarity score reflecting a degree of similarity between the valid domain name and the similar domain name, such that the similarity score can be used to generate a ranked list of domain names similar to the valid domain name.

In a further example, the recurrent neural network is trained using valid domain names and observed malicious similar domain names and/or linguistic rules.

The details of one or more examples of the invention are set forth in the accompanying drawings and the description below. Other features and advantages will be apparent from the description and drawings, and from the claims.

BRIEF DESCRIPTION OF THE FIGURES

FIG. 5 is a list showing a valid domain input and similar domain names generated as an output, consistent with an example embodiment.

DETAILED DESCRIPTION

Figure 1:
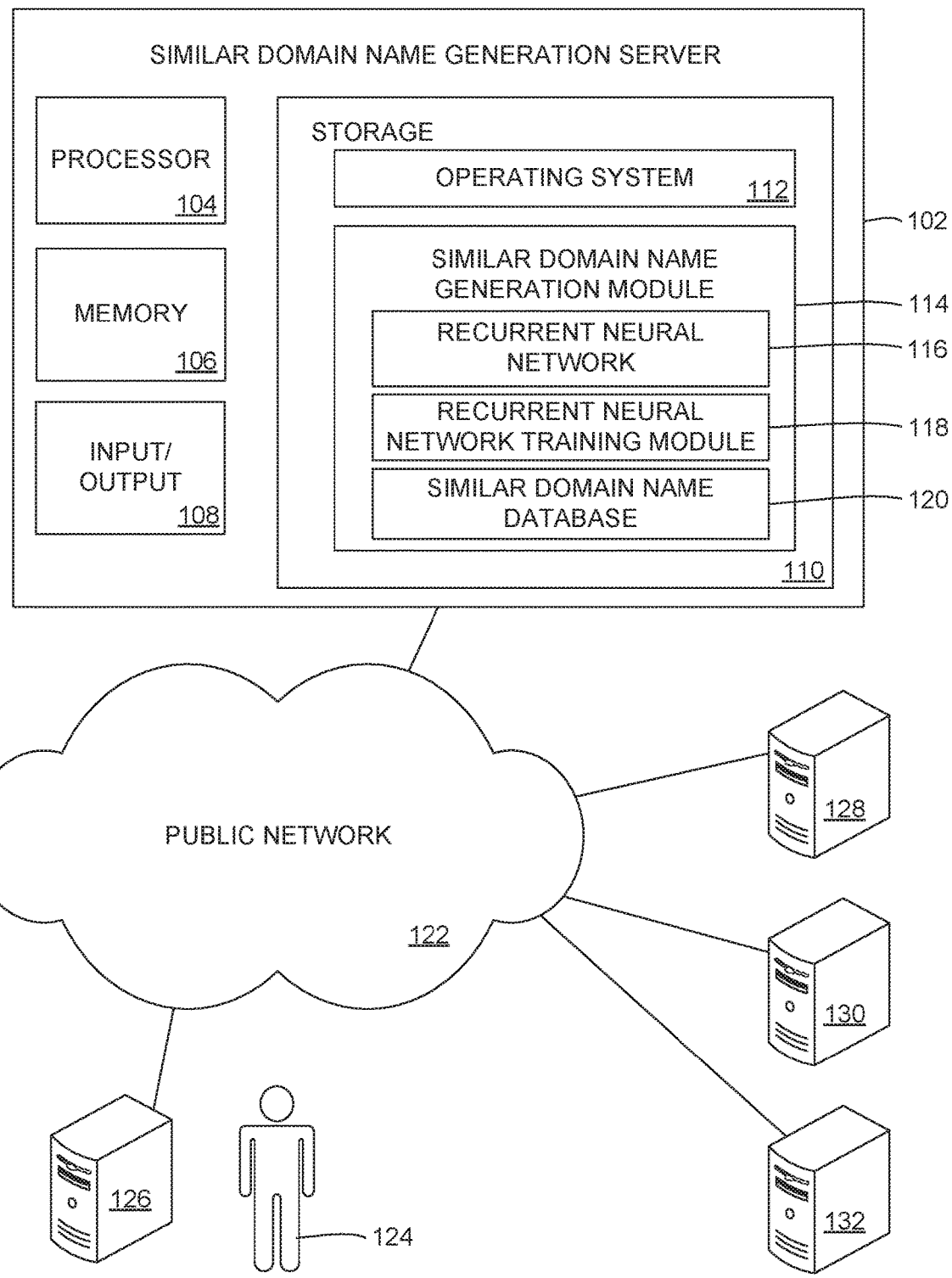
FIG. 1 shows a computerized server comprising a similar domain name generation module using machine learning, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Smartphone apps, Microsoft Word documents containing macros, Java applets, and other such common documents are all frequently infected with malware of various types, and users rely on tools such as antivirus software or other malware protection tools to protect their computerized devices from harm. Malicious users often attempt to steal user credentials to popular online websites or services by creating fake sites pretending to be the popular websites, directing users to the fake sites by prompting them with emails alerting them to fictitious problems with their account that can be fixed by logging on or providing other such valuable information.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. Web browser features or extensions similarly block unwanted content such as scripts, advertisements, popups, tracking cookies, known malicious downloads or websites, and other such undesirable web content.

In a more detailed example, some malicious users send emails purporting to be from popular websites or online services such as Apple or PayPal, suggesting that a user's account has been compromised or otherwise needs attention. The email provides a link to a website that purports to be Apple or PayPal, but is in fact a different but similar-sounding site run by the malicious user such as aapple.com or papayl.com, which may go unnoticed by the user. When the user clicks the link and visits the malicious site pretending to be the real site, the user is prompted to enter login credentials, account numbers, or other such information, which the malicious user can then use to access the user's account such as to steal money, services, or data. In other examples, a user may mis-type a website's URL, such as by typing spple.com instead of apple.com, and be directed to a website designed to take advantage of typos (sometimes known as "typosquatting"). Although tools such as anti-malware software or browser extensions are available to block or warn a user about known malicious websites, malicious users can easily avoid such measures by creating new malicious websites.

Some examples described herein therefore seek to generate a list of website domain names that are similar to a known website domain, such that they may be registered by the known website domain owner, blocked by anti-malware or other tools, or otherwise used to protect users from mistaking such sites for the real known website domains. In one such example, machine learning methods such as neural networks are used to generate domain names similar to a known domain so that they can be registered or blocked to protect users. In a further example, a recurrent neural network is trained using a database of valid domain names and known similar domain names, such as from a database of typosquatting or other similar domain names. In another example, linguistic rules such as knowledge of what makes two words easy for a user to mistake for another word are further used to generate the similar domain names, such as by using linguistic rules to train the machine learning system.

FIG. 1 shows a computerized server comprising a similar domain name generation module using machine learning, consistent with an example embodiment. Here, a similar domain name generation server 102 comprises a processor 104, memory 106, input/output elements 108, and storage 110. Storage 110 includes an operating system 112, and a similar domain name generation module 114 that is operable to generate domain names that are similar to a valid domain name. The similar domain name generation module 114 further comprises a recurrent neural network 116 operable learn to generate domain names similar to a provided valid domain name. The recurrent neural network trains by altering its configuration, such as multiplication coefficients used to produce an output from a given input to reduce or minimize the observed difference between the expected output and observed output. A recurrent neural network training module 118 uses a similar domain name database 120 to train the recurrent neural network 118 by providing valid domain names as inputs and examples of similar domain names as outputs, training the machine learning system to generate similar domain names when provided with a valid domain name.

The similar domain name server is connected to a public network 122, such as the Internet, which connects the server with other computer systems such as user 124's computer 126, a domain name server 128, valid domains such as valid domain 130, and domains intentionally selected to be similar to valid domains such as similar domain 132.

When a user 124 wishes to visit a domain, the user typically types the domain name into user's computer 126 via a web browser. The web browser checks with a domain name server such as 128 to find an IP address associated with the domain, and then initiates communication with the server having the associated IP address such as valid domain server 130. But, because users often mistype or misspell words such as domain names, malicious users or those simply wishing to take traffic from valid domains often register common misspellings of popular domains, which is sometimes known as typosquatting. A user 124 misspelling youtube.com and hoping to be directed to valid domain 130 may instead inadvertently type youtbue.com and be directed instead to similar domain 132. This enables the owner of similar domain 132 to take traffic from valid domain 130, or to set up a website similar to valid domain 130's site but that is configured to capture login credentials for valid domain 130 or other valuable information from user 124 or other users inadvertently directed to the similar domain 132.

In a similar example, a malicious user sends emails purporting to be from popular websites or services such as apple.com or paypal.com, informing each recipient that their account has been compromised or that some other attention is needed. The email provides a link to log in and remedy the issue, but the link provided in the email directs the recipient to the similar domain 132 (such as youtbue.com) instead of the valid domain (such as youtube.com) from which the email appears to have originated. When the user follows the link and is directed to similar domain 132, the owner of similar domain 132 can provide services or other content competing with YouTube, or can prompt the recipient to log in so that their credentials can be captured or stolen (sometimes known as phishing).

To address problems such as these, the owner of a valid domain 130 such as YouTube may wish to identify common misspellings or similar domain names that are most easily confused with the domain youtube.com, so that the domains can be registered on behalf of the valid domain owner, redirected to the valid domain, placed on a blacklist of potentially malicious websites, or other such actions taken. The valid domain owner may become aware of email phishing campaigns to certain similar domains and take action under domain name dispute resolution proceedings to take custody of the similar domain names, but more desirably may wish to register several of the most similar domain names proactively to prevent such issues from arising. Rather than speculate as to what domain names may be similar to the valid domain, similar domain name generation server 102 enables a domain owner to generate a list of domain names most similar to the valid domain, and in a further example facilitates registration of the similar domains such as by indicating unregistered similar domains and providing links or tools to facilitate domain name registration.

In a more detailed example, the owner of the domain youtube.com wishes to find similar domain names and register them, to proactively prevent phishing and typosquatting attacks against users of YouTube. The owner 124 uses computer 126 to access similar domain name generation server 102, and enters "youtube.com" as the valid domain name for which similar domains are desired. The similar domain name generation server uses "youtube.com" as an input string to the similar domain name generation module 114, which uses its trained recurrent neural network 116 to generate a list of domain names similar to "youtube.com," such as "youtbue.com" and "yotube.com." In further examples, the generated list of similar domain names are ranked in order of similarity, indicate the degree of similarity, and/or indicate whether each of the similar domain names is currently registered or unregistered. The unregistered domains are in some embodiments selectable for registration, such as by providing the user with check boxes to indicate which similar domains are selected for registration before clicking a button to register the selected similar domains.

Similarity in some examples is based upon which domain names are most easily misread or mistaken for the valid domain name, and in other examples is based on which domain names are most likely to be a mistyped version of the valid domain name or on a combination of the two methods. For example, linguistic research suggests that one word can be easily mistaken for another if their first and last letters are the same, and letters between the first and last letter of the word are swapped. Further, words are more easily mistaken for one another if two neighboring vowels are swapped, or if two neighboring consonants are swapped. Using the valid domain "youtube.com," these principles tell us a reader would be more likely to read "yuotube.com" or "youtbue.com" as the valid domain than "oyutube.com" or "yotuube.com." Similarly, users are more likely to mistype a domain by swapping neighboring letters on the keyboard such as "n" and "m," or by omitting a letter or adding an extra letter neighboring a letter in the valid domain by mis-hitting a keyboard key. Knowledge of these principles can be used to build a similar domain database 120, to rank or order the resulting similar domain name list, or for other such purposes in generating similar domain names.

The recurrent neural network 116 of FIG. 1 in a more detailed example is trained using an encoder and a decoder coupled to recurrent neural network nodes. The encoder receives a valid domain name and converts it into a representation that can be fed into the recurrent neural network. The decoder uses the representation rules of the encoder to decode the output of the recurrent neural network encoder (the latent representation) into a similar domain name which can be output in text form to a user. In a further example, similar domain name outputs can be achieved by adding random noise to the encoder's output for the valid domain name. This causes the decoder to reconstruct a string to the that is similar to but different from the valid domain name input. In other examples, similar or equivalent methods can be used, such as convolutional neural networks or other such methods.

The training data for the recurrent neural network in some examples comes from similar domain name database 120, from actual or observed typosquatting, phishing, brandjacking, or similar incidents (which in some examples are a part of similar domain database 120), from linguistic rules, and from other such data sources. The data in similar domain name database is in a further example divided into training data and testing data, such that the training data is used to train the recurrent neural network and the testing data is used with the trained recurrent neural network to confirm the degree to which the trained network is able to generate output similar to the data in the similar domain name database.

Figure 2:
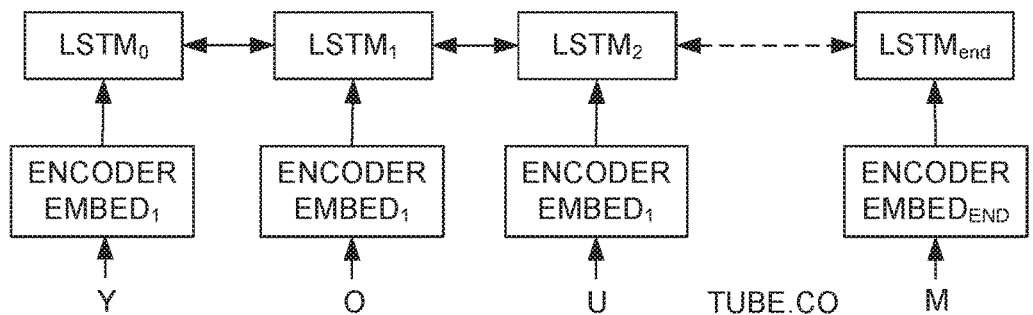
FIG. 2 is a diagram of a recurrent neural network encoder for generating similar domain names, consistent with an example embodiment.

FIG. 2 is a diagram of a recurrent neural network encoder for generating similar domain names, consistent with an example embodiment. The encoder converts the domain name "youtube.com" provided as text input into an input format more easily processed by the recurrent neural network, which in this example comprises a series of bidirectional Long Short-Term Memory (LSTM) nodes. The encoded format of the valid domain name is sometimes known as the latent representation, and the output of the neural network is similarly subsequently processed in a decoder to convert the latent representation of the output into a human-readable text string. In a more detailed example, different noise is added to the input of the decoder to generate a similar domain name.

The block diagram of FIG. 2 shows "youtube.com" provided as an input string representing a valid domain name for which similar domain names are desired to a character-by-character bidirectional recurrent neural network. In the bidirectional network shown, the output of each LSTM block is shared with both the preceding and the following LSTM blocks in the string. The encoder is bidirectional in this example rather than unidirectional to facilitate the recurrent neural network's processing of language patterns, such as learning that a domain ending in .ru will likely have preceding text in Russian rather than another language.

The recurrent neural network of FIG. 2 shows four of eleven nodes used to receive the input string of "youtube.com," but the network is constructed to receive longer domain names as input. In a more detailed example, the number of nodes is chosen based on a likelihood of being able to handle any likely valid domain name received as input, such 96 or 128 nodes to receive domain names having up to 96 or 128 characters. In another example, the number of nodes is based on the maximum length observed in the training material in similar domain name database 120. Domains shorter than the maximum length are padded with a special <pad> character. The received characters are further encoded based on the number of distinct characters in the training database or the "radix", which in this example is 39 distinct letters, numerals, or special permitted characters such as dashes/hyphens and the <pad> character. Each LSTM node in FIG. 2 has a size of 64 in this example, meaning that the hidden state comprises 64 units.

Figure 3:
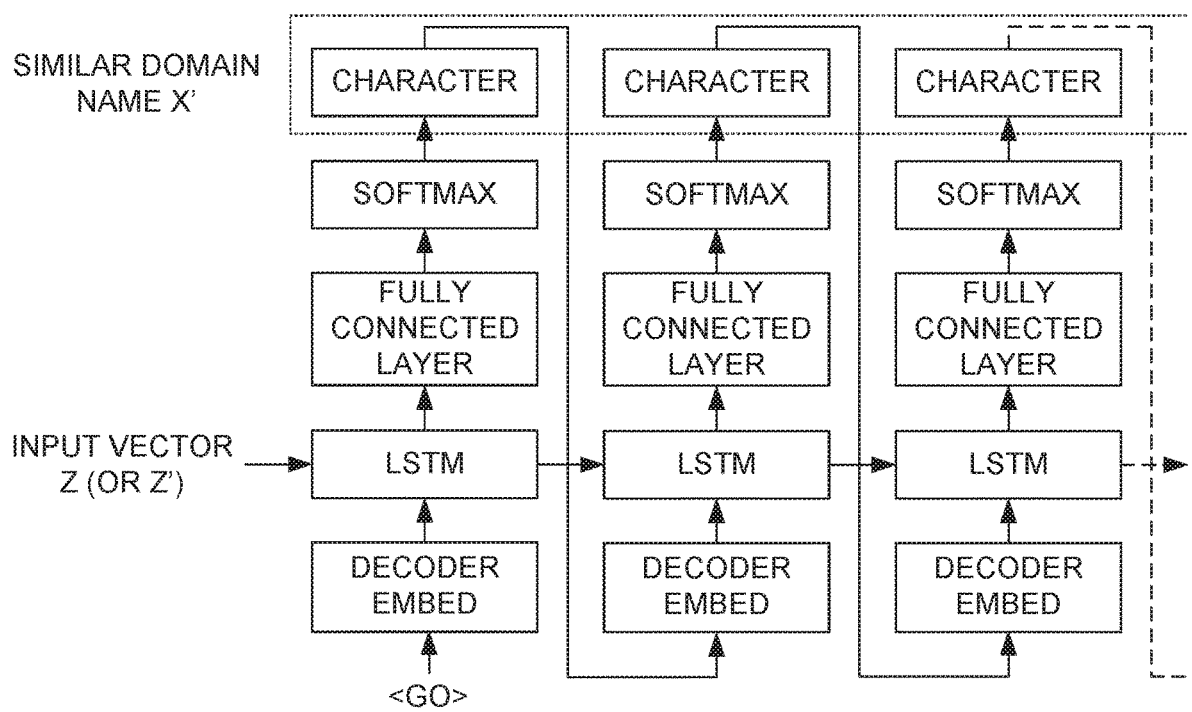
FIG. 3 is a diagram of a recurrent neural network decoder for generating similar domain names, consistent with an example embodiment.

FIG. 3 is a diagram of a recurrent neural network decoder for generating similar domain names, consistent with an example embodiment. The decoder consists of an embedding layer of size 11, which is independent of the embedding layer of FIG. 2's encoder. The LSTM layer of size 64 follows, which is the same LSTM as FIG. 2. The decoder receives an input vector Z, or a "noised" version of the vector Z', which serves as the initial state of the recurrent neural network. The network is unidirectional, in that each node generates a character output which is fed to the embedding layer of the next node but not the preceding node. Because the first node does not receive a preceding character, it is fed a special <go> character or token to start, which is one of the distinct 39 symbols that the embedding layer is configured to receive as an input.

The output of the LSTM of each node is passed to a fully connected layer of the recurrent neural network, which in this example has the size of the radix or 39 characters. The fully connected layer output is fed to a softmax layer that indicates a predicted probability of each character being the desired output, and a arg max operator selects the character for output that has the highest softmax value. The character is then recorded as shown at the top of FIG. 3, and fed to the next node in the recurrent neural network along with the input vector, such that the next node produces the next character in the similar domain name character string. In further embodiments, variations or refinements to the architectures shown in FIGS. 2 and 3 are made, such as regularizing the latent space using a Variational Auto Encoder, or VAE.

Figure 4:
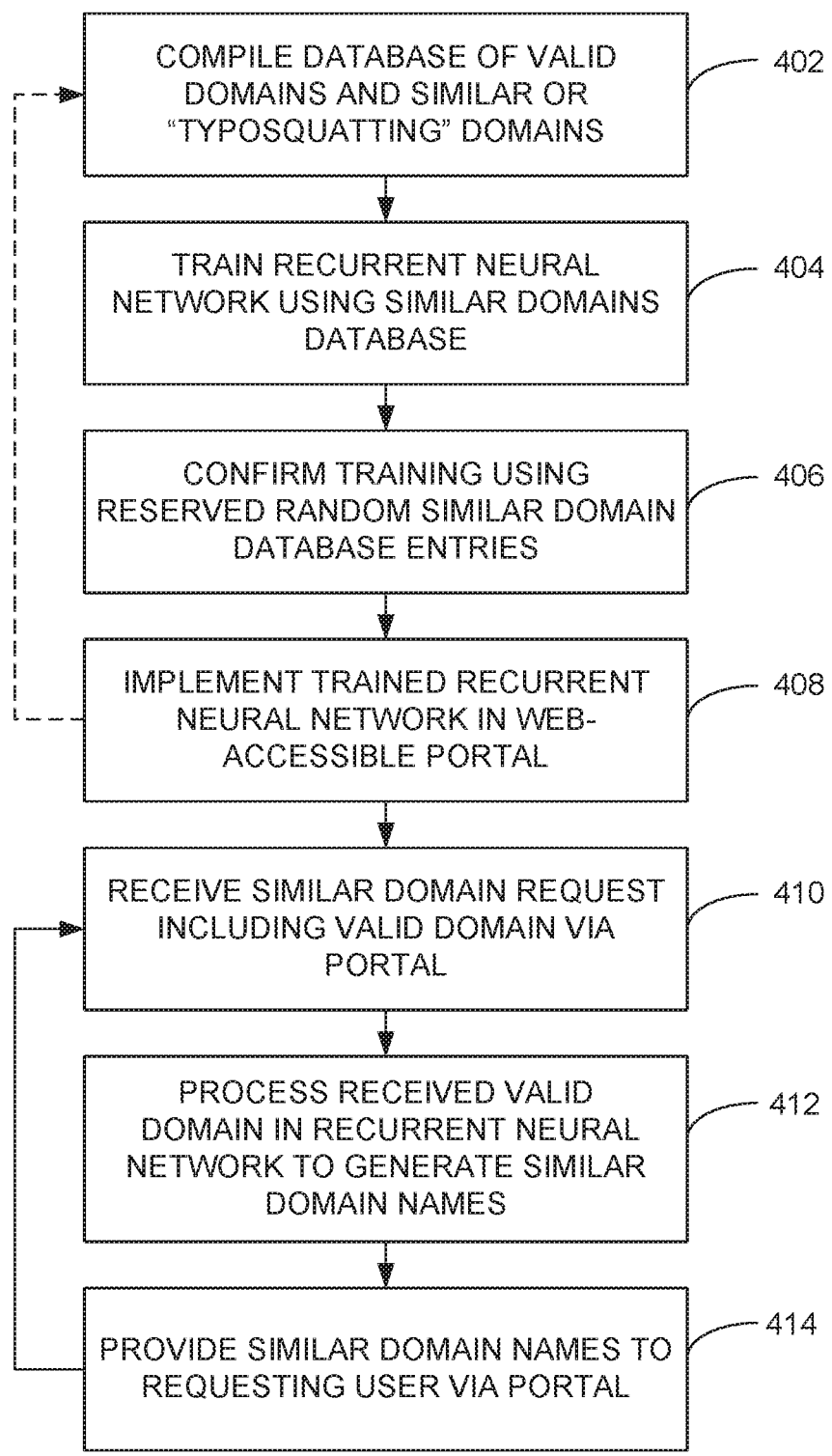
FIG. 4 is a flowchart showing training and using a recurrent neural network to generate similar domain names, consistent with an example embodiment.

FIG. 4 is a flowchart showing training and using a recurrent neural network to generate similar domain names, consistent with an example embodiment. At 402, a data set of valid domain names and similar domain names such as domain names registered by typosquatters or used in phishing and/or brandjacking attempts is compiled in a database. The compiled database is divided into two parts, a randomly selected portion reserved for testing, and a larger portion used to train the recurrent neural network at 404. Once the neural network is trained using the larger portion of the data set, the randomly selected reserved portion is passed through the trained recurrent neural network and the resulting similar domain names generated by the recurrent neural network are compared with the actual observed similar domain name to determine the effectiveness of the recurrent neural network at generating domain names that are similar to the valid domain name provided as input.

In a more detailed example, the loss function of the recurrent neural network is cross-entropy defined on a one-hot encoded character and a softmax probability, with the loss defined as loss=likelihood+0.1*divergence, where likelihood is the cross entropy loss and divergence is the Kullback-Leibler (KL) divergence from VAE regularization discussed previously. An adaptive momentum optimizer (ADAM) with a fixed learning rate LR=1e−2 is used, and the model is trained on a fixed number of epochs with no early stopping criteria or validation. It has been experimentally determined that 50 epochs result in reasonable performance measured by qualitative results (e.g., manual human review of whether the generated similar domains are actually similar). During training, the predicted character is not used as input for the next step, but instead the character that should have been predicted is input. Once the network is trained, the input to the next step is the predicted character (and the context or input vector) as shown in FIG. 3.

Once the recurrent neural network is trained at 404 and tested at 406, the trained recurrent neural network is implemented in a web-accessible portal at 408. In other embodiments, the trained recurrent neural network is accessed via an Application Programming Interface (API) or other such method. When the web-accessible portal in this example receives a similar domain request at 410 that includes a valid domain as part of the request, it processes the received valid domain in the trained recurrent neural network at 412 to generate one or more similar domain names. The similar domain names generated are provided to the requesting user via the web portal at 414.

The recurrent neural network training process from 402-408 is in some examples repeated occasionally using new training data, or when other changes such as an optimization in network configuration or other changes result in improved performance. The process of receiving similar domain requests and providing similar domain names from 410-414 is typically repeated many times once the recurrent neural network is trained, as different customers or clients take advantage of the benefits provided by the machine learning similar domain generation system.

FIG. 5 is a list showing a valid domain input and similar domain names generated as an output, consistent with an example embodiment. Here, the input valid domain of "youtube.com" is provided as an input to the trained recurrent neural network or other such machine learning system, and outputs of various iterations of recurrent neural network processing of the valid domain input are shown below. The outputs are different for each iteration despite processing the same input in the same trained network due to intentional insertion of noise or random variation in the input vector, such as during the encoding or other preprocessing of the input vector of the decoder.

In the example of FIG. 5, each of the output similar domain names is shown as black text in an ordered list. In some examples, the list will include other information or functionality, such as providing color or other indication of which of the similar domains listed are available for registration, and in a further example provide check boxes or clickable links to register similar domains that are available for registration. The ordering of similar domain names is in this example random, but in other examples will be ordered based on an estimated likelihood of a person mistaking the similar domain name for the valid domain name when reading the similar domain name and/or the likelihood of a user mistyping the valid domain name as the similar domain name. These likelihoods can be estimated using various methods such as linguistic properties, the softmax values of the decoder (e.g., of FIG. 3) or other output values, observation of duplicate similar domain name outputs using different noised valid domain name inputs, or other such methods.

The examples presented here show how machine learning systems such as recurrent neural networks can be used to generate domain names similar to valid domain names, such that the generated similar domain names can be registered or otherwise used to prevent or detect typosquatting, phishing, brandjacking, and other malicious activity. Although the recurrent neural network shown in the examples here is implemented on a computer server, a variety of other computerized systems may be used in other examples for the recurrent neural network, as well as various clients, servers, and other devices involved in performing the methods described in the examples above.

Figure 6:
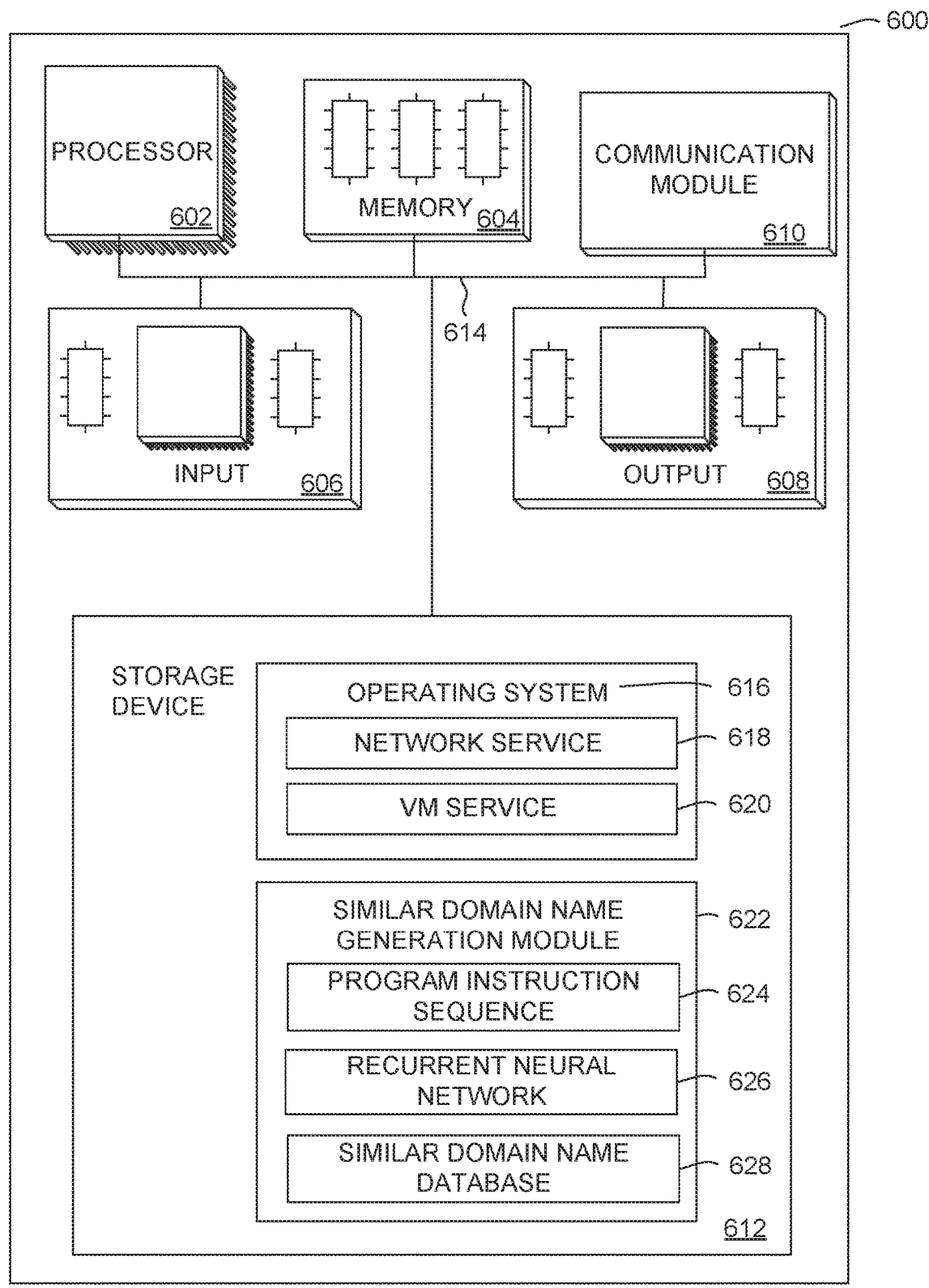
FIG. 6 is a computerized system comprising a similar domain name generation module, consistent with an example embodiment.

FIG. 6 is a computerized system comprising a similar domain name generation module, consistent with an example embodiment. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600, in one example, further includes an operating system 616 executable by computing device 600. The operating system includes in various examples services such as a network service 618 and a virtual machine service 620 such as a virtual server. One or more applications, such as similar domain name generation module 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as malware evaluation module 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 1004 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as malware evaluation module 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, 4G, LTE, or 5G WiFi radios, and Near-Field Communications (NFC), and Universal Serial Bus (USB). In some examples, computing device 600 uses communication module 610 to wirelessly communicate with an external device such as via public network 122 of FIG. 1.

Computing device 600 also includes in one example one or more input devices 606. Input device 606, in some examples, is configured to receive input from a user through tactile, audio, or video input. Examples of input device 606 include a touchscreen display, a mouse, a keyboard, a voice responsive system, video camera, microphone or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 608 include a speaker, a light-emitting diode (LED) display, a liquid crystal display (LCD), or any other type of device that can generate output to a user.

Computing device 600 may include operating system 616. Operating system 1016, in some examples, controls the operation of components of computing device 600, and provides an interface from various applications such as similar domain name generation module 622 to components of computing device 1000. For example, operating system 616, in one example, facilitates the communication of various applications such as malware evaluation module 622 with processors 602, communication unit 610, storage device 612, input device 606, and output device 608. Applications such as similar domain name generation module 622 may include program instructions and/or data that are executable by computing device 600. As one example, malware evaluation module 622 executes a program instruction sequence 624 that uses trained recurrent neural network 626, and similar domain name database 628 can be similarly used by program instruction sequence 624 to train or update the recurrent neural network. These and other program instructions or modules may include instructions that cause computing device 600 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of generating similar domain names using machine learning, comprising:
    receiving a valid domain name;
    evaluating the received valid domain name in a neural network trained to generate similar domain names, wherein the neural network comprises a recurrent neural network using a bidirectional encoder and a unidirectional encoder; and
    providing an output comprising at least one domain name similar to the received valid domain name generated by the neural network.

2. The method of generating similar domain names using machine learning of claim 1, wherein the neural network is trained using valid domain names and observed malicious similar domain names.

3. The method of generating similar domain names using machine learning of claim 1, wherein the neural network is trained using linguistic rules.

4. The method of generating similar domain names using machine learning of claim 1, wherein providing an output further comprises providing a ranked list of domain names similar to the received valid domain name.

5. The method of generating similar domain names using machine learning of claim 1, further comprising registering at least one of the at least one output domain names similar to the received valid domain name.

6. The method of generating similar domain names using machine learning of claim 1, further comprising indicating which of the at least one output domain names are registered.

7. The method of generating similar domain names using machine learning of claim 1, wherein the output of the neural network further comprises a similarity score reflecting a degree of similarity between the valid domain name and the similar domain name.

8. The method of generating similar domain names using machine learning of claim 7, further comprising using the similarity score of two or more generated similar domain names to generate a ranked list of domain names similar to the valid domain name.

9. A method of training a neural network to generate similar domain names, comprising:
    receiving a valid domain name and a similar domain name;
    evaluating the received valid domain name in a neural network and observing an output of the neural network, wherein the neural network comprises a bidirectional encoder and a unidirectional encoder; and
    if the similar domain name and the observed output of the neural network differ, modifying at least one parameter of the neural network to generate an output more similar to similar domain name than the observed output of the neural network.

10. The method of training a neural network to generate similar domain names of claim 9, further comprising using linguistic rules to train the neural network.

11. The method of training a neural network to generate similar domain names of claim 9, wherein the output of the neural network further comprises a similarity score reflecting a degree of similarity between the valid domain name and the similar domain name.

12. The method of training a neural network to generate similar domain names of claim 9, wherein the neural network comprises a plurality of Long Short Term Memory (LSTM) nodes.

13. The method of training a neural network to generate similar domain names of claim 9, wherein the neural network comprises a plurality of Gated Recurrent Units (GRUs).

14. A method of generating similar domain names using machine learning, comprising:
    receiving a valid domain name;
    evaluating the received valid domain name in a machine learning system trained to generate similar domain names, wherein the machine learning system comprises a recurrent neural network using a bidirectional encoder and a unidirectional encoder; and
    providing an output comprising at least one domain name similar to the received valid domain name generated by the machine learning system.

15. The method of generating similar domain names using machine learning of claim 14, wherein the machine learning system is trained using valid domain names and observed malicious similar domain names.

16. The method of generating similar domain names using machine learning of claim 14, wherein the machine learning is trained using linguistic rules.

17. The method of generating similar domain names using machine learning of claim 14, wherein providing an output further comprises providing a ranked list of domain names similar to the received valid domain name.

18. The method of generating similar domain names using machine learning of claim 14, wherein the output of the machine learning system further comprises a similarity score reflecting a degree of similarity between the valid domain name and the similar domain name.

* * * * *